United States Patent [19]

Garczynski et al.

[11] Patent Number: 4,492,855
[45] Date of Patent: Jan. 8, 1985

[54] BADGE READER WITH IMPROVED SLIDE ARRANGEMENT

[75] Inventors: John S. Garczynski, Norristown; Frank J. Reed, Philadelphia; Jeffrey C. Hahn; John J. Dobson, both of Oreland, all of Pa.

[73] Assignee: Peripheral Dynamics, Inc., Plymouth Meeting, Pa.

[21] Appl. No.: 396,936

[22] Filed: Jul. 9, 1982

[51] Int. Cl.³ .............................................. G06K 7/10
[52] U.S. Cl. ................................. 235/458; 235/474; 235/482; 235/485; 235/486
[58] Field of Search ............... 235/458, 474, 380, 382, 235/485, 486

[56] References Cited

U.S. PATENT DOCUMENTS

| | | | |
|---|---|---|---|
| 3,693,156 | 9/1972 | Di Lello | 340/825.33 |
| 3,818,187 | 6/1974 | Lovendusky | 235/380 |
| 4,114,028 | 9/1978 | Baio et al. | 235/458 |
| 4,236,667 | 12/1980 | Crowley | 235/482 |

*Primary Examiner*—Harold I. Pitts
*Attorney, Agent, or Firm*—Woodcock, Washburn, Kurtz, Mackiewicz & Norris

[57] ABSTRACT

Badge reading apparatus for reading a data encoded badge or the like has a channel for receiving the badge, the channel having a slide positioned therein which clock-holes for producing synchronizing timing signals, the slide being adapted to move within the channel in abutting relation to the badge. Means are provided for maintaining the badge and slide in fixed abutting relation while the badge is moved so as to read, such means incorporating a wrap-around spring on which the badge rides and which keeps the badge properly aligned. The slide element further incorporates a fold-over arrangement for the clock-holes, whereby the slide need not contain the same number of clock-holes as there are rows of data to be read from the badge, thereby enabling a smaller slide element and reduced size of the overall apparatus. Flexibility in providing the clock-holes in different arrangements may be provided by the embodiment of a slide constructed of a transparent or semi transparent material with an opaque film attached thereto, the film carrying the programmed clock-holes and other information useful in operation of the reading apparatus.

22 Claims, 10 Drawing Figures

BADGE READER WITH IMPROVED SLIDE ARRANGEMENT

BACKGROUND OF THE INVENTION

1. Field of the Invention

This invention lies in the field of badge and document reading devices and, more particularly, manually operable badge readers for reading data from badges and the like.

2. Description of the Prior Art

Rapidly expanding data processing technology has resulted in a proliferation of industrial systems for collecting and utilizing data on a regular basis. One such system that is currently increasing and has a large potential for industrial applications is that of collecting data from badges or the like which are carried by individuals. In many industrial systems, activity records and other events are monitored by having individuals at predetermined locations insert badges into readers, which badges are designed to be encoded so as to permit reliable data recognition. The types of such badges are standardized, and for many badge types it is either impractical or undesirable to have a motorized transport system within the reader. Data collection in such systems is done on a random one-shot basis, and for such applications the manually operable badge reader is an optimum data entry device.

A badge reader with a reliable data clocking means is shown in U.S. Pat. No. 4,187,980, assigned to the same assignee, which patent is incorporated herein by reference. The referenced patent discloses a manually operated card reader incorporating a slide element having clock-holes thereon, and means for ensuring that such slide moves in synchronism with the badge as it is inserted into the reader by the operator. Suitable sensors and accompanying electronics are provided to synchronize the reading of data from the badge with the detection of the passage of slide clock-holes past a predetermined point in the reader.

While the system as disclosed in the referenced patent has been highly satisfactory, it has been found that improvements are desirable in the operation of the slide so as to ensure optimum synchronization between the slide and the badge being read. Likewise, it is noted that the physical size of the slide imposes a limitation on the compactness of the badge reader, which in turn limits the ability of the manufacturer to minimize cost of production. These and other limitations in terms of sensor placement and maintenance of sensor reliability give rise to a need for improvement of specific design features associated with such badge readers. The design presented herein provides substantial improvements, as is set forth more fully in the Description of the Preferred Embodiment.

SUMMARY OF THE INVENTION

It is an object of this invention to provide a badge reader of flexible design, permitting badges and the like to be inserted manually in an efficient and reliable manner.

It is another object of this invention to provide a badge reader utilizing a slide which provides synchronizing clock pulses for reading of data from a badge or the like, with an improved slide design which enables a reduction in size of the overall badge reader.

It is another object of this invention to provide a reader for badges and the like, which reader utilizes a slide which is maintained in abutting relationship with the badge which is being read, and providing improved means for maintaining the badge and slide in firm abutting relationship so as to optimize reliability of the data reading operation.

It is another object of this invention to provide a badge or card reader which utilizes a slide element which is used in controlling the timing of data reading, and which incorporates improvements in the slide construction which result in more reliable data processing, and optimization of sensor design and operation.

It is another object of this invention to provide a badge or card reader comprising a slide element which is used for controlling the timing of data reading, and having means for sealing the chamber wherein the slide and badge move so that dust cannot reach the electronics and sensor portions of the reader.

It is a further object of this invention to provide a badge reader which incorporates a latch device in the mouth thereof, for preventing insertion or retraction of the badge under specified operational circumstances.

It is a still further object of this invention to provide a badge reader which utilizes a slide element for controlling the timing of data reading, which slide element contains a substantially transparent base material and a substantially opaque film positioned thereon, the film having coded timing indicia positioned thereon.

In accordance with the above objects, there is provided a badge reading apparatus for reading a data encoded badge or the like, having a mechanical structure with a channel for receiving the badge within the apparatus, the channel having a slide positioned therein having clock-holes for producing synchronizing timing signals, said slide being adapted to move within said channel in abutting relation to the badge. Means are provided for maintaining the badge and slide in fixed abutting relation while the badge is moved in a given direction, such means incorporating a wrap-around spring which maintains a uniform linear tension on the slide and keeps it properly aligned during its travel. The slide element also incorporates a fold-over arrangement for the clock-holes, whereby the slide contains fewer clock-holes than there are rows of data to be read from the badge, thereby enabling a smaller slide element and reduced device size. Corresponding electronics is provided to generate, from the slide clock-holes, a synchronizing signal for each row of data to be read and processed. In one embodiment, the slide is constructed of a clear material, having an opaque film attached to it, the film carrying the clock-holes and other information useful in optimizing the reliability of the data read operation, e.g., checking for sensor "end of life".

DESCRIPTION OF THE PREFERRED EMBODIMENTS

Figure 1:
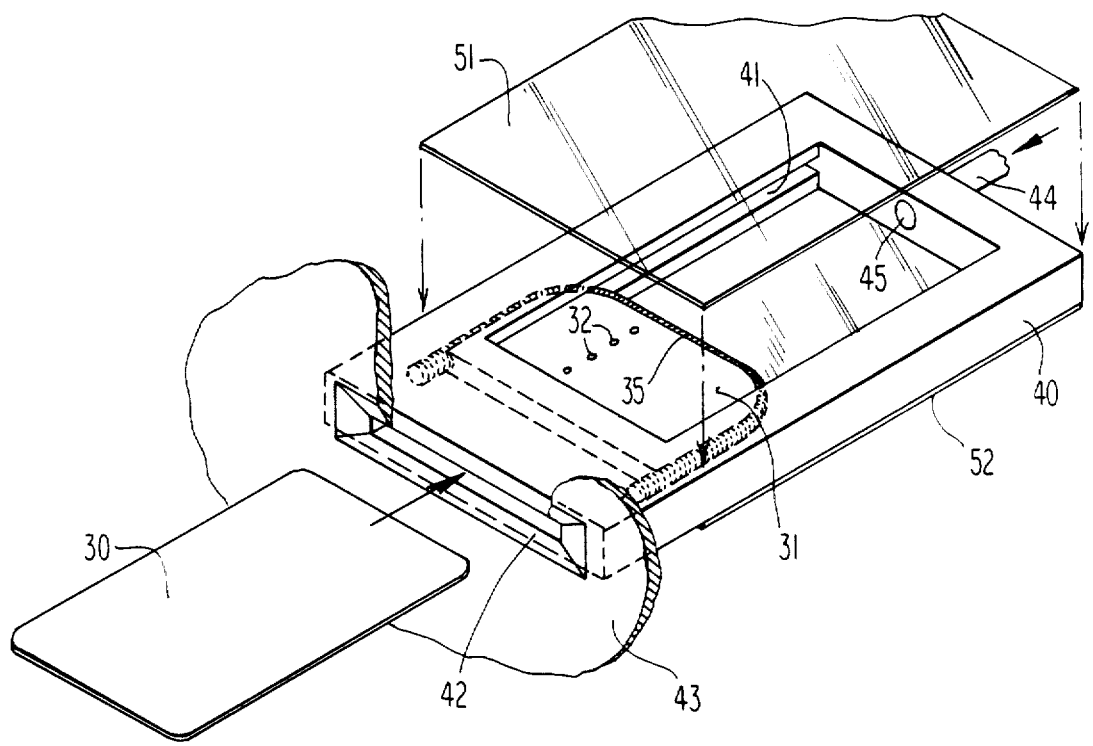
FIG. 1 is a perspective view illustrating the slide operation of the preferred embodiment, including a novel wrap-around spring for controlling and orienting slide movement.
Figures 2, 2A:
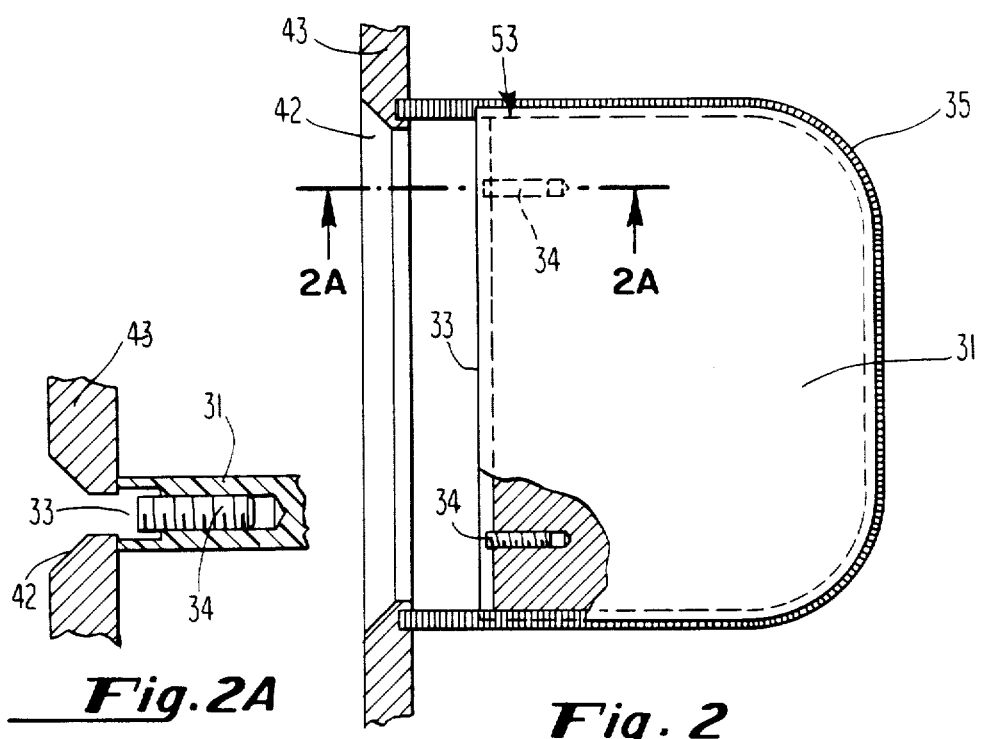
FIG. 2 is a detailed view, partially cut away, of the slide element and spring, with both ends of the spring anchored on the reader face.
FIG. 2A is a detailed cross-sectional view showing the slide element in the normal position against the inside of the reader mouth, such that no dust can enter through the mouth.

Referring now to FIG. 1, there is shown a view of the basic combination of slide element and badge as used in the apparatus of this invention. A badge 30 is shown in position for entry, in the direction of the arrow, through a mouth 42 of slide housing 40. The term "badge" as used herein embraces any suitable type of data carrier that can be used with this type of device. Housing 40 is contained within the overall housing of the apparatus, the front portion, or face of which is illustrated at 43. Slide housing 40 contains longitudinal grooves 41 along each side, which form tracks, or rails through which slide element 31 and badge 30 are moved. As illustrated, each end of spring 35 is attached to housing 40 near mouth 42. Alternately, one end of the spring may be anchored to the side of the slide itself, right near the front, at a point as indicated by the arrow 53 in FIG. 2. By anchoring only one end of the spring to the front of the reader, the use of a larger diameter wire guage is enabled, with little difference in overall spring tension on the slide element. Spring 35 surrounds three sides of slide element 31, as is further illustrated in FIG. 2. Slide 31 has a front groove 33 which receives the badge 30 in abutting relationship and is grooved around the remainder of its periphery to receive coil spring 35. Set screws 34, within slide 31, may be appropriately adjusted to fine tune the synchronization of the clock-holes 32 in the slide element with the rows of data on badge 30. By moving the screws 34 relatively in or out, one may adjust the distance from the leading edge of the badge to the clock-holes, thereby ensuring exact synchronization. Further, if any skew is found to exist, this also may be fine tuned by adjustment of screws 34.

Still referring to FIG. 1, there is illustrated means for making the reader dust proof, i.e., preventing dust from reaching the electronics and sensor portions. A clear, light transparent plastic film 51 is placed over the top edges of housing 40, and a comparable light transparent film 52 is placed over the lower surface of housing 40, thereby providing a chamber defined by the two films and housing 40. The electronic sensors and other electronic circuitry, such as discussed hereinbelow, are suitably housed on PC boards mounted above and below the housing, and enclosed within the outer housing, or casing in a substantially dust free manner. Further, as seen by reference to FIG. 2A, when the slide element 31 is in its normal position it rests against the inside of mouth 42, and prevents air and dust from entering through the mouth. In addition, a positive air pressure may be provided through source 44 and outlet 45 to exhaust the inner chamber of dust while the slide element is pushed backward during a badge read operation.

In operation, the user manually inserts badge 30 through mouth 42 and into abutting relationship with the slide, and as the badge is inserted into the device the badge and the slide element together are moved toward the back. In a manner as described fully in the above referenced U.S. Pat. No. 4,187,980, electrical signals generated due to the passage of clock-holes 32 are utilized to synchronize data reading of the encoded data on badge 30.

As used herein, the term clock-holes, as used in connection with slide element 31, may mean either holes in the normal sense, or may mean marks which are sensed in a reflective mode. The basic idea is that the slide element contains the synchronizing indicia, in the form of holes or marks, which is provided in such a way as to generate accurate synchronizing or timing signals. While normally holes in element 31 are preferred, other forms of timing indicia are clearly within the scope of this invention. Likewise, there is no limitation on the form of encoding used on badge 30, meaning that the data may be in the form of holes, marks, combinations thereof, etc.

The spring 35 is suitably made of 0.008 inch diameter spring wire, stainless steel, 300 series, coiled to a 0.125 OD, ±0.005, by way of example. The spring initial tension is maximum for the wire diameter and coil size. Approximately one-half of the spring diameter fits within the side and back grooves of slide 31 and the other half rides within the grooves or tracks 41. Thus the spring serves the function of a bearing and guiding surface on which the slide rides. Further, spring 35 gives a uniform spring force which is applied to the slide element, with linear tension as a function of slide displacement. It can be seen from FIG. 1 that the spring, in the way it is wrapped around the slide element, keeps the element properly aligned during its longitudinal travel, which is important in preventing skewing, therefore ensuring reliable generation of clock pulses.

In the prior art, the number of clock-holes 32 in slide 31 would necessarily correspond to the number of rows of data in badge 30. For this reason, the length of housing 40, and thus the minimum depth of the overall apparatus, would have to be approximately twice the length of the badge. In order to improve upon this situation, in the device of this invention the number of holes 32 is a predetermined fraction of the number of rows of data to be read from badge 30. For example, if badge 30 contains 10 rows of data to be read, slide 31 may have 5 clock-holes, the clock-holes being spaced at an interval corresponding to the physical interval between the data rows of badge 30. To illustrate the principle, slide 31 could also have one, two, three or four clock-holes 32, corresponding to the same 10 rows of data for card 30.

In the preferred embodiment, the spacing of the clock holes is the same as the spacing between adjacent rows of data on the badge. In operation, as the badge and slide together are pushed from front to back, in the direction of the arrow as illustrated, a synchronizing or clock pulse is generated each time the slide element moves a distance corresponding to the distance between adjacent rows of data on badge 30. As discussed in detail hereinbelow, sensors are mounted to generate light pulses for each passage of a clock-hole 32, thereby generating the necessary synchronizing or timing signals. Where the number of clock-holes 32 is a fraction of the number of rows of data, one or more additional sensors is mounted to generate the required additional clock signals after the clock-holes 32 have passed a first sensor. This feature is illustrated in connection with FIGS. 3A and 3B below.

Figure 3A:
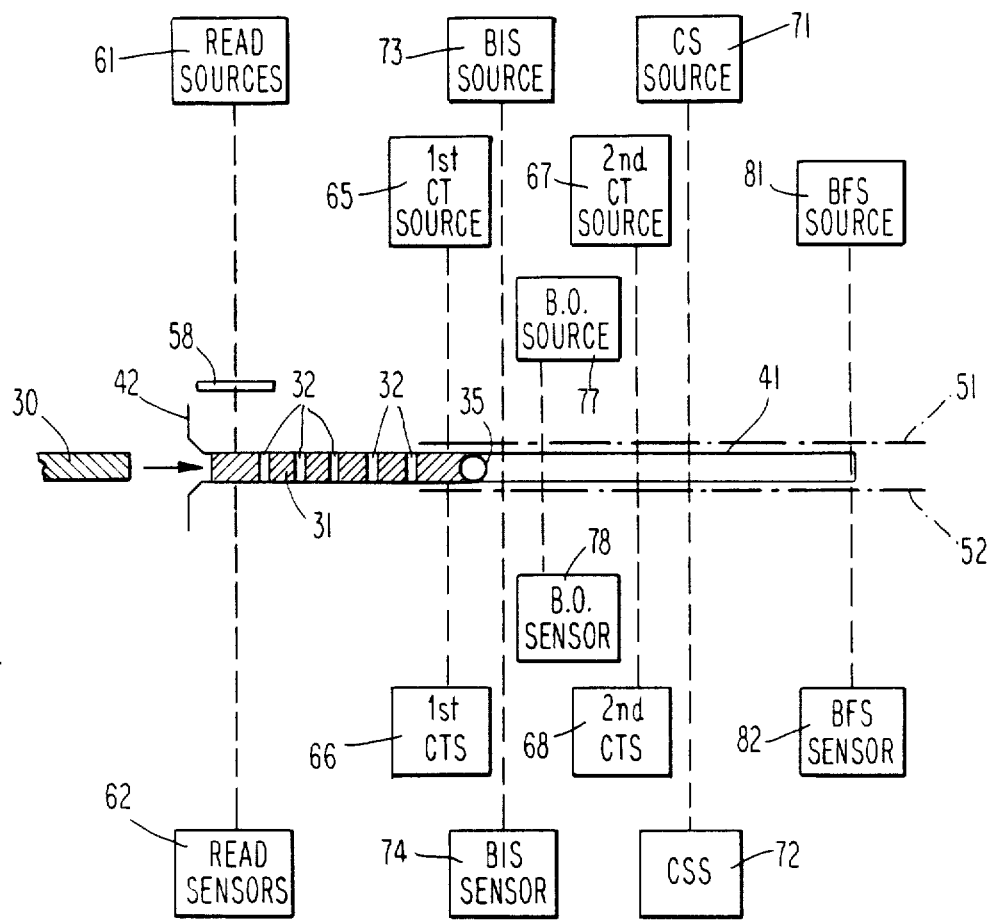
FIG. 3A is a schematic representation of the electronic sensor elements of the badge reader, positioned relative to the slide channel, illustrating the condition where the badge has not yet been entered into the reader.

Referring now to FIG. 3A, there is shown a schematic illustration of the placement of the badge reader sensor pairs relative to the slide track, or groove rail 41. For FIG. 3A, slide element 31 is shown positioned at the front of the housing, the front edge of the slide being held against the interior edge of mouth 42 by spring 35. For this illustration, 5 clock-holes 32 are illustrated, it being also assumed that the card or badge 30 has 10 rows of data to be read. The distance between holes 32 corresponds to the distance between rows of data on badge 30. As shown, the badge 30 will be moved from left to right, pushing the slide element 31 toward the right hand extension of track 41. In so doing, first the slide element and then also the badge will move past various sensors, which are now described.

Just within mouth 42, or to the right of mouth 42 as shown in FIG. 3A, there is positioned a read head comprising a row of read sources 61 on one side of track 41, and a corresponding row of read sensors 62 on the other side and in registration with the read sources. The read sources 61 are any suitable electronically operated photosources, such as light emitting diodes (LEDs), and the read sensors 42 are suitable photo transistors, as well known in the art. Under normal operating conditions, where no badge is entered, the slide element 31 blocks the light path from sources 61 to sensors 62. However, when badge 30 is inserted into the reader, for any row having data, a light path is provided corresponding to each hole, in a well known fashion. Of course, if badge 30 is encoded with mark information, such that it is operated in the reflective mode, then the read sensors 61 would have to be positioned so as to detect reflected light.

Figure 3B:
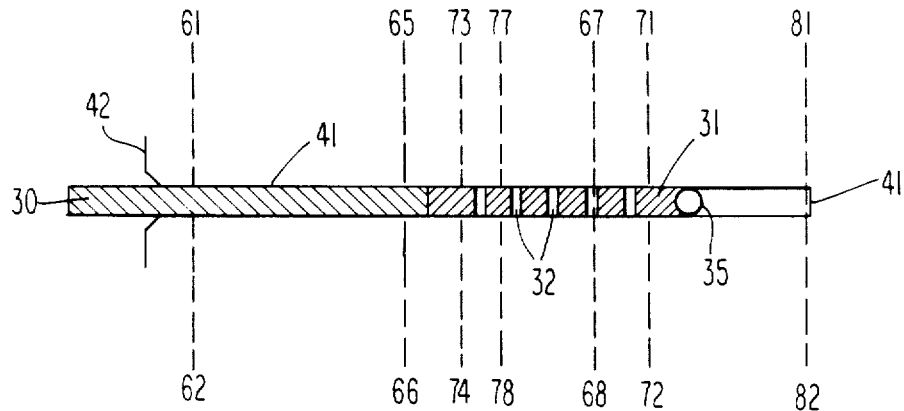
FIG. 3B is a schematic illustration, similar to FIG. 3A, showing the relative position of sensor elements relative to the slide channel, and for the condition where a badge has been entered into the reader and is in abutting relationship to the slide.

Moving from left to right in FIG. 3A, there is next seen a first pair of source and sensor elements, comprising a first clock track (CT) source 65 and a first clock track sensor (CTS) 66. The vertical line between source 65 and sensor 66 indicates the path of light from source to sensor, it being seen that for no badge entry, the 1st CTS does not receive any light. Just to the right, there is located a Badge In Station (BIS) source 73 and a BIS sensor 74. The vertical line between source 73 and sensor 74 indicates that the light path lies just to the right of spring 35, such that without a badge being entered into the reader, sensor 74 is normally illuminated. When sensor 74 is dark, this is an indication that a badge is in the reader. Sensor 74 may be used to turn on the LEDs for all other sensors, thus preserving both the idle power dissipation of the reader, as well as the degredation parameters of the LEDs. Still proceeding to the right, there is seen a badge orientation (BO) source 77 and BO sensor 78, which is positioned to one side of housing 40 so as to detect the presence of an orientation hole in the badge, if such is provided. The orientation hole is suitably positioned non-symmetrically, i.e. to one side of the center axis of the badge, in a well known manner. Next, there is illustrated a 2nd CT source 67 and 2nd CT sensor 68, followed by a Clock Switching (CS) source 71 and Clock Switching Sensor (CSS) 72. Finally, at the far back of track 41, there is located a Badge Finally Seated (BFS) source 81 and a BFS sensor 82, which provides an indication of when the badge is pushed as far into the reader as can be, such that the slide element is seated at the very back of track 41. FIG. 3B shows the same schematic, with badge 30 inserted into the reader such that slide element 31 has been pushed toward the back of track or channel 41.

Figure 4:
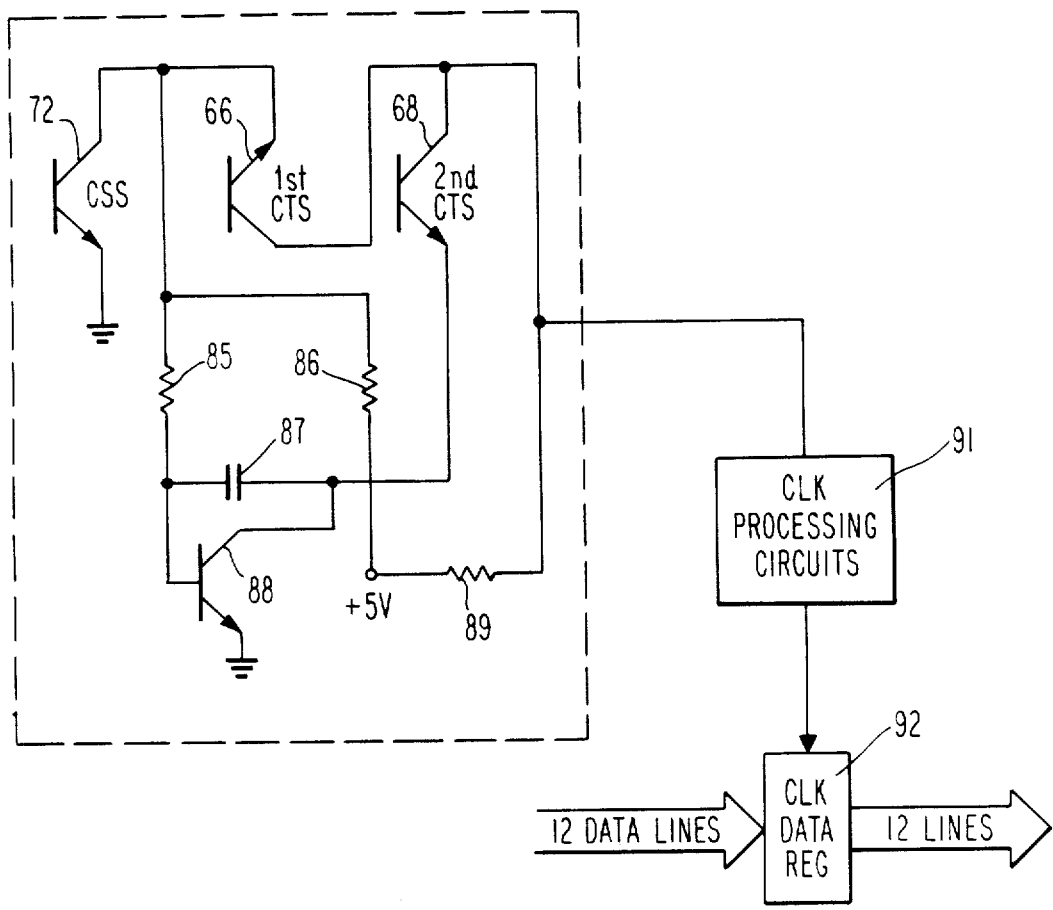
FIG. 4 is an electronic circuit diagram of a portion of the sensor electronics, for providing switching which is used in conjunction with the fold-over feature of the slide element.

Referring now to FIG. 4, as well as FIGS. 3A and 3B, the fold over operation of the clock-holes can be illustrated. Transistor 72, CSS, is a photo detector for providing clock switching. Transistor 72 is positioned, as seen in FIGS. 3A and 3B, such that it is initially uncovered by the slide, but becomes covered after the slide 31 has been advanced to the point that the 5th or last clock-hole 32 has been read by sensor 66. Thus, up until the last slide hole has been sensed for the first time, and the slide has been pushed just incrementally past the point of reading the last clock-hole 32, transistor 72 receives light, such that it is saturated, providing a low output at its collector. This condition biases the first clock track sensor 66 by placing a low signal on its emitter, so that when it receives light it is saturated. In other words, transistor 66 is enabled to detect when each of the first five clock-holes passes by. As long as transistor 72 remains on, the input to the base of transistor 88 is held low, keeping it off. This means that transistor 68 (2nd CTS) is not enabled, while transistor 66 is enabled. Thus, during this situation for the first reading of the series of clock-holes 32, the appearance of a pulse of light on sensor 66 results in the common collector of transistors 66 and 68 going low. Thus, a clock signal is generated which is a drop from a high voltage of about +5 V to a low signal of close to 0 V. When the slide 31 has advanced so that it covers transistor 72, meaning that the slide leading edge comes to the vertical line between 71 and 72 as shown in FIGS. 3A and 3B, then transistor 72 is no longer saturated. The voltage divider of resistors 85 and 86 puts a sufficient positive bias on the base of transistor 88 to switch it on, holding the emitter of transistor 68 low, thereby enabling it. Note that in this situation, since the emitter of transistor 66 is high, it is disabled. Thus, the next series of clock pulses (e.g., the next 5) is generated when the pulses of light hit sensor 68, causing it to saturate, causing a negative going voltage pulse. In this manner, ten clock signals are generated from a set of five clock-holes in the slide. As can be understood, different combinations of clock-holes 32 and rows of data in the badge may be utilized, with corresponding sensors and switching circuitry to enable generation of the appropriate clock pulses.

In the situation illustrated in FIG. 3B, the badge 41 has been inserted into the reader, pushing the slider 31 toward the back. As illustrated, a second clock-hole 32 is passing by clock track sensor 68, thereby generating the 7th clock pulse. By the time the badge is fully inserted, the next three holes 32 will have passed sensor 68, such that all 10 clock signals will have been generated, thereby enabling reading all 10 rows of data at sensor 62.

As further seen in FIG. 4, the clock signals developed at the common collector of transistors 66, 68 are passed through clock processing circuits 91, which circuits are similar to those illustrated in the referenced U.S. Pat. No. 4,187,980. The clock signals are then inputted to clock data register 92, which also receives the 12 data lines from the 12 sensors 62, as illustrated, providing the data in a usable form.

Figure 5:
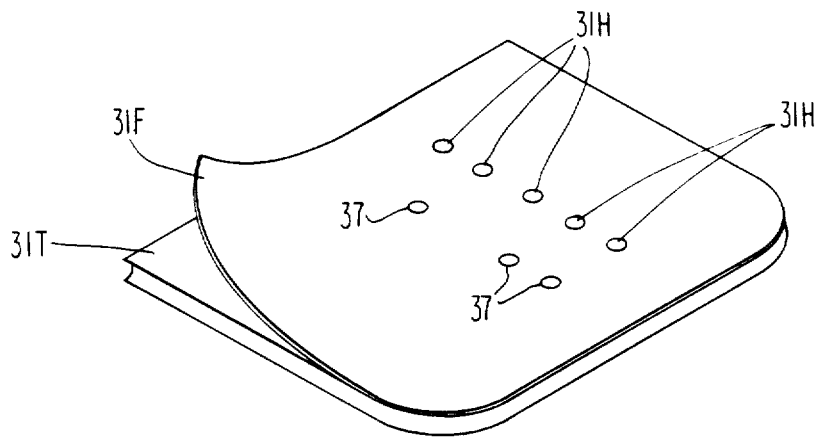
FIG. 5 is a perspective schematic view of the embodiment of the slide element which utilizes a light transparent material with an opaque film which carries clock information and/or other information to be used in operation of the badge reader.

Referring now to FIG. 5, there is shown a unique embodiment of slide element 31. The base material of the element, illustrated at 31T, is constructed of a substantially light transparent material such as a suitable plastic or plexiglass. A film 31F, suitably metal, or Mylar or other like material, and which is substantially opaque, is placed on one side of the transparent portion 31T. Film 31F contains a column of holes 31H, which provide the clock-holes of the slide element. This arrangement provides the advantage that the holes 31H can be positioned in the film 31F with great accuracy. Further, if it is desired to change the operating characteristics of the reader, film 31F can be replaced with a different film, as desired. Film 31F may be cemented on, or alternately the slide element may be two layers of suitable plastic or plexiglass, with the film pinned therebetween.

It is to be understood that this embodiment may use any suitable type of film. The film may be a thin metallic foil with etched or machined holes to provide the timing indicia. The film may be any relatively opaque medium, metallic, plastic or other, with transparent areas or voids thereon. Likewise, the opaque base material may also have predetermined voids or clock holes.

If it is desired to instruct the badge reader to read only certain rows of data, this may be accomplished by designing the film to have clock-holes only in specified positions corresponding to the rows of data to be read. For example, as illustrated in FIG. 5, a second column of holes 37 may be positioned for generating timing pulses after the switchover, i.e., timing pulses corresponding to the last five rows of data. In other words, as illustrated, timing pulses would be generated for reading data in rows 1-5, 7, 9 and 10. In this arrangement, as is understood, the second sensor is to be displaced laterally with respect to the first sensor in order to detect passage of the holes 37.

In another embodiment, as illustrated in FIG. 3A, a strip of photosensitive plastic or other material 58 may be positioned between the read sources 61 and the read sensors 62. Strip 58 has the property of having a varying transmissiveness as a function of the intensity of the light directed therethrough. The transmissiveness is indirectly proportional to the light intensity. By utilizing such material, and positioning it with respect to the read head, there is provided an automatic adjustment for variations with time of the intensity of light delivered by the sources 61, thus stabilizing the reading operation. Also, strip 58 may also comprise a spectral filter, screening out any given band width of UV, IR or visible light which may be unwanted for given applications. In the reflective reading mode, such a color filter enables portions of badges, or marks on badges, which are colored the same color as the filter, to become effectively transparent to the reader.

Figure 6A:
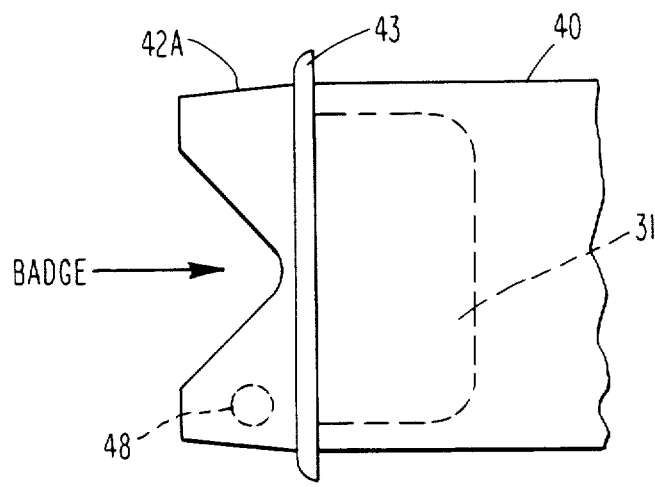
FIG. 6A is a schematic diagram of an alternate embodiment, showing a mouth portion which extends outward from the front of the reader and containing latching means for latching the badge.
Figure 6B:
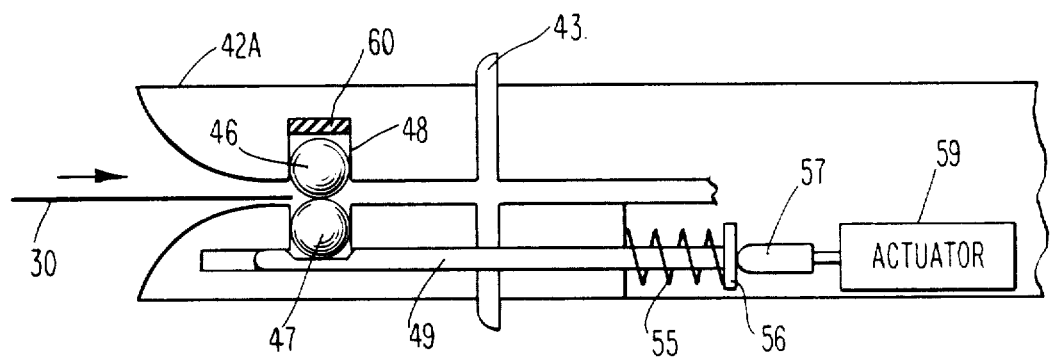
FIG. 6B is a schematic cross-sectional diagram showing the badge latching means in a normal position wherein the badge is free to move.
Figure 6C:
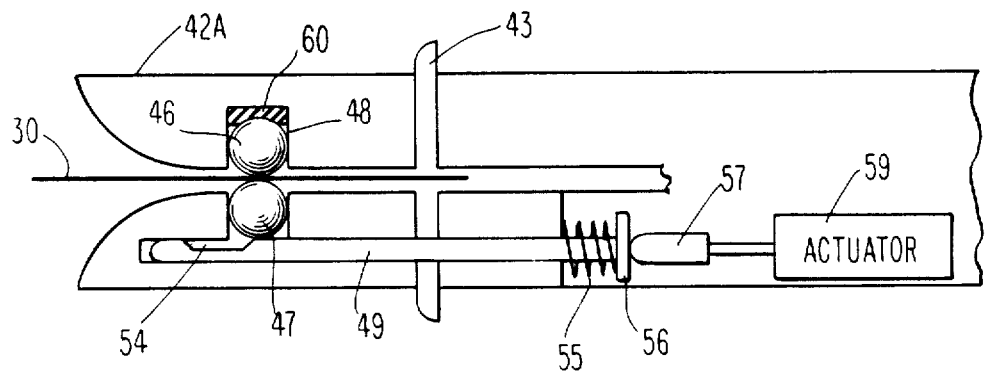
FIG. 6C is a schematic cross-sectional diagram, similar to that of FIG. 6B, but illustrating the latching means in a latched position, whereby the badge is restrained from movement.

Referring now to FIGS. 6A, 6B and 6C, there is illustrated a latch means which is incorporated in the reader, for preventing insertion of a badge into, or withdrawal of a badge from the reader. This embodiment utilizes a forward-projecting mouth 42A, as illustrated. The mouth contains a hole 48, having a resilient material 60 at the top thereof, and houses holes 46, 47. Under normal conditions, as shown in FIG. 6B, lower ball 47 sits in a groove 54 of latch pin 49, and a badge 30 can easily be inserted between balls 47 and 48. When a signal is transmitted to actuator 59, it causes piston 57 to move against pin head 56, driving the pin forward against the restraining force of spring 55. When this happens, ball 47 is ramped upward, preventing any movement of a badge past the balls, as seen in FIG. 6C. In operation, actuator 59 may receive an actuating signal after a badge has been inserted, and a non-acceptable code has been read. In such a case, the badge may be trapped inside, or within, the latch, such that the user cannot retrieve it. Upon release of the actuator, ball 47 would descend and permit the badge to start exiting. While the badge is so exiting, the actuator can be re-energized, to place a predetermined amount of drag on the badge, to prevent it from popping out of the reader.

We claim:

1. Apparatus for reading a data encoded badge, comprising a channel for receiving said badge within said apparatus, said channel permitting said badge to move within it, an opaque slide having a given number of transparent clock-holes therein and adapted to be moved within said channel, paired optical source and detector means disposed on opposite sides of said slide for generating clock signals to detect movement of said clock-holes there between, means for maintaining said badge and said slide in abutting relation while said badge is being moved in a given direction within said apparatus, and means for reading data from said badge while said badge is moved in said given direction, said reading means incorporating means for utilizing said clock signals for synchronizing said data reading with the movement of said clock-holes, wherein plural pairs of optical source and detector means are provided to detect movement of given clock-holes there between and generate plural clock-signals therefrom such that a number of said clock signals greater than the number of said clock-holes is generated by movement of said badge in said given direction, thereby reducing the overall length of the apparatus.

2. The apparatus as described in claim 1, wherein said maintaining means comprises spring means which is wrapped around at least three sides of said slide.

3. The apparatus as described in claim 1, wherein said slide is carried on and bears against said spring means.

4. The apparatus as described in claim 1, wherein said slide has a first number of clock-holes, and said data encoded badge has a second number of rows of data, which rows are read sequentially by said apparatus, the second number of rows of data being greater than the first number of said clock-holes.

5. The apparatus as described in claim 4, wherein the distance between said clock-holes equals the distance between adjacent rows of data on said badge.

6. The apparatus as described in claim 1, comprising a mouth providing entry of said badge into said channel, and comprising means for sealing said channel from dust except at said mouth.

7. The apparatus as described in claim 6, wherein said slide is normally at rest against the inside of said mouth and thereby blocks entry of dust through said mouth.

8. The apparatus as described in claim 1, comprising normally released latch means, and means for actuating same, for preventing movement of a badge within said apparatus.

9. A badge reader adapted to receive and read a data encoded badge, said badge containing data arranged in a first predetermined number of rows in fixed relation to each other, said reader comprising a read station for reading said badge data, a slide adapted to move within said reader, an inlet permitting entry of said badge into said reader and means for maintaining said badge and said slide in abutting relation while said badge is being moved in a given direction within said reader, said slide having a second predetermined number of clock-holes adapted for generation of clock synchronizing signals for synchronizing reading of said rows of data, said second number of clock-holes being different from said first number of data rows, and means for detecting the movement of said clock-holes and for outputting a clock synchronizing signal corresponding to the movement of said slide past said read station, and for outputting signals corresponding to the data on said badge.

10. The reader as described in claim 9, wherein said maintaining means comprises a coil spring wrapped substantially around three sides of said slide, and track means for holding said spring such that it acts as a bearing upon which said slide rides.

11. The reader as described in claim 9, comprising a first sensor for detection of the passage of said slide clock-holes passed a first predetermined location and a second sensor for detection of the passage of said slide clock holes passed a second predetermined location, and switching means for switching one of said sensors at a time to an operative condition.

12. The reader as described in claim 9, wherein said slide comprises a light transparent base material, and a light opaque film which is co-planar therewith, said film having holes positioned therein to provide said clock-holes.

13. The reader as described in claim 12, wherein said light opaque film comprises holes positioned to correspond to only selected ones of the rows of the data of said badge, thereby providing for selectivity in reading the data encoded on such badge.

14. The reader as described in claim 9, wherein said read station comprises a plurality of read light sources and a plurality of read light sensors, and further comprises a portion of material containing plastic or a like material and having the property of varying light transmissiveness as a function of incidental light, said material being positioned between said read sources and said read sensors.

15. The reader as described in claim 14, wherein a portion of said slide is composed of semi-transparent material so as to reduce the light detected by said read light sensors when no badge is in the reader, thereby enabling an "end of life" test.

16. Apparatus for reading a data encoded badge, comprising a channel for receiving said badge within said apparatus, said channel permitting said badge to move within it, a generally flat rectangular slide having a given number of clock holes therein and adapted to be moved within said channel, means for generating clock signals derived from the movement of said clock holes, means for maintaining said badge and said slide in abutting relation while said badge is being moved in a given direction within said apparatus, and means for reading data from said badge while said badge is moved in said given direction, said reading means incorporating means for utilizing said clock signals for synchronizing said data reading with the movement of said clock-holes, characterized by said maintaining means comprising continuous coil spring means wrapped around substantially three sides of said slide.

17. A badge reader adapted to receive and read a data encoded badge, said badge being adapted to hold data in selected ones of a first predetermined number of rows in fixed relation to each other, said reader comprising a read station for reading said badge data, a slide adapted to move within said reader, an inlet permitting entry of said badge into said reader and means for maintaining said badge and said slide in abutting relation while said badge is being moved in a given direction within said reader, said slide having a second predetermined number of clock holes adapted for generation of clock synchronizing signals for synchronizing reading of said badge data, said clock holes being positioned in selected ones of a second predetermined number of rows, said rows having the same said fixed relation to each other, and plural means for detecting the movement of each of said clock-holes for generating plural clock synchronizing signals corresponding to the movement of each of said clock holes past said read station.

18. Apparatus for reading a data encoded badge comprising:
  a channel for receiving said badge within said apparatus, said channel permitting said badge to move within it;
  latch means for preventing removal of said badge from said apparatus;
  means for reading a code from said badge;
  means for examining said code to determine whether said code is valid or invalid;
  means for actuating said latch means upon detection of invalid code on said badge; and
  wherein said latch means comprises means for compressing said card against stop means upon actuation of said actuator means.

19. The apparatus of claim 18 wherein said latch means comprises means for compressing said card against stop means upon actuation of said actuator means.

20. The apparatus of claim 18 further comprising:
  a slide adapted to be moved within said channel;
  means for maintaining said badge and said slide in abutting relation while said badge is being moved in a given direction within said apparatus.

21. The apparatus of claim 20 wherein said slide comprises said stop means against which said badge is compressed upon actuation of said actuator means.

22. The apparatus of claim 20 wherein said apparatus additionally comprises clock signal generation means for generating a clock signal in synchronism with the motion of said badge.

* * * * *